Oct. 25, 1927.

K. D. LOOSE 1,646,921

FOOD PRODUCT

Filed Sept. 24, 1926

Inventor:
Kenneth D. Loose.
by Emery, Booth, Janney and Varney
Attys.

Patented Oct. 25, 1927.

1,646,921

UNITED STATES PATENT OFFICE.

KENNETH D. LOOSE, OF BRONXVILLE, NEW YORK, ASSIGNOR TO LOOSE WILES BISCUIT COMPANY, OF LONG ISLAND CITY, NEW YORK, A CORPORATION OF NEW YORK.

FOOD PRODUCT.

Application filed September 24, 1926. Serial No. 137,571.

This invention relates to food products and, in its preferred embodiment, is an improvement upon the food product disclosed in the patent to Jacob L. Loose, No. 969,173, dated September 6, 1910.

My invention aims to provide a novel cracker, biscuit or a like food product of a very light, fluffy and mealy character, and desirably one which, while it may be handled as a single unitary article, may nevertheless be readily separated into small portions of predetermined size and outline.

An important object of my invention is to provide a food product, such as a cracker or a biscuit, and especially such as shown in said patent to Loose No. 969,173, which shall be very light and fluffy and at the same time shall be mealier and shorter than the usual cracker or biscuit.

A characteristic of a desirably light and fluffy cracker or biscuit is the presence therein of large air bubbles or pockets. In the course of my experimentation I have discovered that I can secure the permanent presence or incorporation of such relatively large air bubbles or pockets in the food product, and thus render the same desirably light, fluffy, mealy and short, by cutting or stamping out the same in the direction of the flow or grain of the dough instead of across or transverse the stream or grain of the dough, as generally practised heretofore. Such cutting or stamping out of the cracker or biscuit in the direction of the flow or grain of the dough is of peculiar importance in a cracker or biscuit which has inherent characteristics that prevent the formation of air bubbles or pockets transversely of the cracker or biscuit. That is to say, if the cracker or biscuit be of that type shown in the said patent to Jacob L. Loose, No. 969,173, which is known upon the market as the "Takhoma" cracker, the breaking line or the line of weakness, with the connecting bars which are characteristic of that cracker necessarily compress the substance of the cracker in such manner as to prevent the formation of relatively long or large air bubbles or pockets, and especially is this so if the name of the cracker or other legend be impressed thereon in the cutting or stamping out of the same, as this act serves to compress the substance of the cracker.

Figure 1:
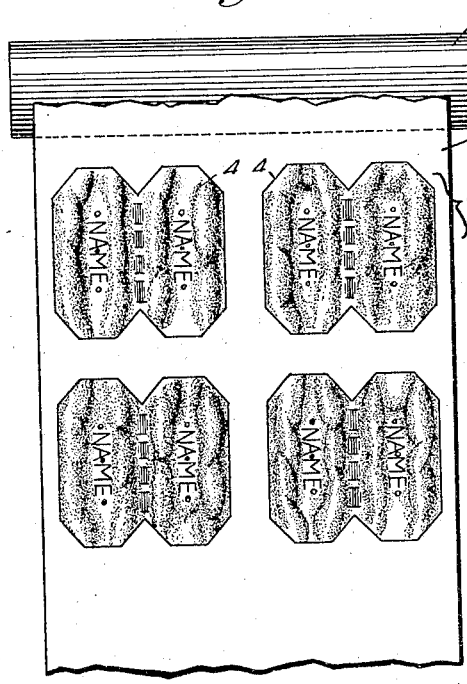
Fig. 1 is a plan view of a small portion of an on-feeding stream of dough, from which crackers or biscuits are stamped in accordance with my invention.

Referring more particularly to the drawing, I have in Fig. 1 represented a stream of dough 1 issuing from between rollers, one of which is indicated at 2. Such stream of dough may be of any suitable width and thickness and, while I have represented the same as merely wide enough for the stamping out, side by side, of two crackers or biscuits, it is to be understood that in actual practice preferably a much larger number of such articles are cut or stamped out simultaneously.

Figure 2:
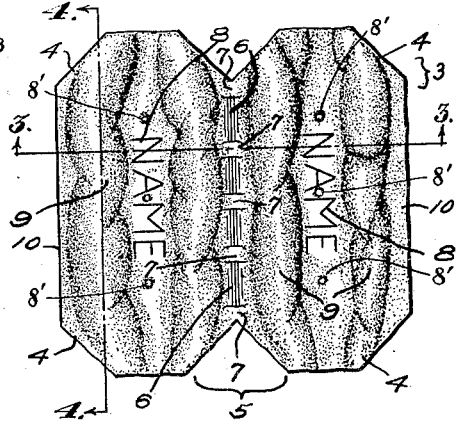
Fig. 2 is a view of one of the crackers or biscuits shown in Fig. 1, but upon an enlarged scale.

Desirably, the cracker or biscuit is of the form represented at 3 in Figs. 1 and 2. That is to say, it is of a general square form, but desirably having inclined corners 4, 4, 4, 4 and reentrant portions 5, 5 which provide like inclined corners when the product is broken around the line of weakness 6. Said line of weakness 6 represents a line of compression of the dough during the stamping out thereof, and the connecting bars 7, which suffice to maintain the cracker against breakage along the line of weakness until sufficient breaking force is deliberately applied, also represent zones of compression of the dough. Moreover, the name or other data concerning the cracker or biscuit, which I have indicated generically by the legend or "name" at 8 in Fig. 2, as well as the docker impressions 8', also constitute a zone or area of compression of the dough during the cutting or stamping out of the same. In manufacturing the biscuit, it may be desired to use dockers alone (which pierce the dough), dockers with name type, name type alone, or a variety of arrangements of dockers.

Figure 3:
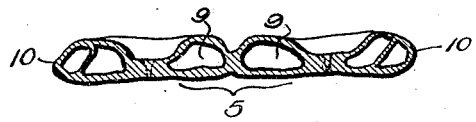
Fig. 3 is a cross section upon the line 3—3 of Fig. 2.
Figure 4:
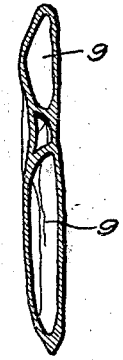
Fig. 4 is a longitudinal section upon the line 4—4 of Fig. 2.

The grain of the dough extends in the direction of the flow thereof, and it is a fact that, heretofore in the making of the said Takhoma biscuit or cracker, the cutting or stamping out implement was so positioned with respect to the direction of flow of the dough that the said articles were cut or stamped out in a direction at right angles to that represented in Fig. 1. It was not, prior to my experimentation, realized that such Takhoma food product could be made lighter and fluffier and be made to contain enlarged air pockets by cutting or stamping out the same in the direction represented in Fig. 1, and thus taking advantage of the grain of the dough. In accordance with my invention, as indicated in Figs. 2, 3 and 4, opportunity is afforded for the formation of relatively large air pockets such as 9, all of which extend lengthwise the cracker or biscuit, considering the same with respect to the stream of dough. By cutting or stamping out the food product in the direction of the stream of dough, it will be observed that opportunity is provided for the creation or formation of such pockets 9 between each longitudinal outer edge of the cracker, as 10, 10, and the name at 8 and also between the name at 8 and the line of weakness 6 with its connecting zones 7.

The air bubbles or pockets frequently develop during the flow of the dough, and even during the act of cutting or stamping out the crackers or biscuits. If the food product were cut transversely of the flow of the dough, I have discovered that such forming pockets are trapped by the impression of the name or legend upon the cracker and by the breaking line of weakness in the two characteristic parts of the Takhoma cracker, so that such air bubbles or pockets do not have a chance to flow or elongate, and therefore the desired very light and very fluffy food product cannot be obtained.

The zone of weakness 6, with its connecting bonds 7, peculiarly cooperates or acts in a cracker such as described, in providing against the breaking of the cracker, except along a predetermined line, and therefore prevents the ready breaking or rupturing (when the cracker is being broken into two pieces) of the adjacent air pockets 9, 9, which would result in the formation of flakes, or the breaking up of the cracker into a number of small pieces in a manner which is obviously undesirable. Furthermore, there is an advantage in having the cracker of a substantially square shape, inasmuch as four well developed areas of air pockets or bubbles are provided for or permitted at the areas indicated, while, at the same time, such air pockets cannot be of such great length as will permit the cracker or biscuit to be broken transversely, in transportation or preliminary to use.

Biscuits or like food products made in accordance with my invention are particularly adapted for sale in bulk or in packages, because the relatively large dimensions of the unitary articles permit them to be easily and conveniently handled, yet when they have been served to the customer they may be readily separated into the smaller parts for convenient eating without the formation of objectionable fragments or crumbs, and the separated parts are individually of a very light and fluffy character, occasioned by the presence of the air pockets 9, and such product not only is very light and very fluffy, but is a very mealy and a very short eating product.

Having thus described my invention, I desire it to be understood that although specific terms are employed, they are used in a generic or descriptive sense and not for purposes of limitation, the scope of the invention being set forth in the following claim.

I claim—

As an article of commercial food, a unitary, thin cracker or biscuit cut or stamped out in the direction of the grain of the dough and having a name or other legend impressed therein in the direction of the grain of the dough, whereby such food product is characterized by the presence of air pockets of relatively great length extending in the direction of such name or legend and between the same and the edges of the cracker parallel to such name, whereby the food product is markedly rendered light and fluffy.

In testimony whereof, I have signed my name to this specification.

KENNETH D. LOOSE.